(12) United States Patent
Ice et al.

(10) Patent No.: US 7,309,170 B2
(45) Date of Patent: Dec. 18, 2007

(54) OPTICAL SUB-ASSEMBLY BLOCK WITH POSITIONING AND RETENTION SYSTEM

(75) Inventors: Donald A. Ice, Milpitas, CA (US); Ricardo Saad, Plano, TX (US)

(73) Assignee: Finisar Corporation, Sunnyvale, CA (US)

( * ) Notice: Subject to any disclaimer, the term of this patent is extended or adjusted under 35 U.S.C. 154(b) by 0 days.

(21) Appl. No.: 11/412,377

(22) Filed: Apr. 27, 2006

(65) Prior Publication Data

US 2006/0245698 A1 Nov. 2, 2006

Related U.S. Application Data

(60) Provisional application No. 60/675,628, filed on Apr. 28, 2005.

(51) Int. Cl.
*G02B 6/36* (2006.01)
*H04B 10/00* (2006.01)

(52) U.S. Cl. .............................. 385/88; 385/89; 385/92; 385/94; 385/52; 398/135; 398/138; 398/139

(58) Field of Classification Search .................. 385/53, 385/60, 76, 77, 78, 88, 89, 92, 93, 94, 52; 398/135, 138, 139

See application file for complete search history.

(56) References Cited

U.S. PATENT DOCUMENTS

| | | | | |
|---|---|---|---|---|
| 5,091,991 A | * | 2/1992 | Briggs et al. | 385/82 |
| 5,138,679 A | * | 8/1992 | Edwards et al. | 385/90 |
| 5,483,611 A | * | 1/1996 | Basavanhally | 385/78 |
| 5,598,495 A | * | 1/1997 | Rittle et al. | 385/75 |
| 6,471,419 B1 | * | 10/2002 | Hall et al. | 385/91 |
| 2006/0245698 A1 | * | 11/2006 | Ice et al. | 385/88 |

* cited by examiner

*Primary Examiner*—Brian M. Healy
(74) *Attorney, Agent, or Firm*—Workman Nydegger

(57) ABSTRACT

In one example, an optical transceiver is provided that includes a ROSA and a TOSA received within a block portion of an OSA block. The OSA block also includes two groups of adjustable elements, one group for each of the ROSA and the TOSA. The adjustable elements of the first group engage the block portion so as to contact the ROSA, and the adjustable elements of the second group engage the block portion so as to contact the TOSA. The position of the adjustable elements in each respective group can then be varied as necessary to locate and/or maintain the ROSA and TOSA in desired positions and orientations relative to, for example, respective optical connector ports of the optical transceiver.

20 Claims, 2 Drawing Sheets

OPTICAL SUB-ASSEMBLY BLOCK WITH POSITIONING AND RETENTION SYSTEM

RELATED APPLICATION

This application claims the benefit of U.S. Provisional Patent Application Ser. No. 60/675,628, entitled OPTICAL SUB-ASSEMBLY BLOCK WITH STABILIZING SET SCREWS, filed Apr. 28, 2005, and incorporated herein in its entirety by this reference.

BACKGROUND OF THE INVENTION

1. The Field of the Invention

This invention relates to optical transceivers and, more specifically, to optical sub-assembly blocks that include a system for positioning and retaining components such as transmitter and receiver optical sub-assemblies in a desired position and orientation.

2. Related Technology

Fiber optic technology is increasingly employed as a method by which information can be reliably transmitted via a communications network. Networks employing fiber optic technology are known as optical communications networks, and are marked by high bandwidth and reliable, high-speed data transmission.

Optical communications networks employ optical transceivers in transmitting information via the network from one node to another. An optical transceiver operating in a network includes a transmitter that receives an electrical signal, containing digital information or other data, from a network device, such as a computer or switch, and uses an optical transmitter such as a laser to convert the electrical signal to a modulated optical signal. The optical signal can then be transmitted in an optical fiber cable via the optical communications network to a remote location. The transceiver also includes a receiver that receives an optical signal from a remote location and converts the optical signal to an electrical signal using a photodetector. These electrical signals are then sent to a host device, such as a computer or switch, for processing or further transmission in the network.

Many conventional transceivers are modular and are constructed and operate in accordance with any of a number of industry standards. The laser associated with the transmitter is typically housed in a transmitter optical sub-assembly, or TOSA. The TOSA communicates with a laser driver, a controller, and other devices on a printed circuit board (PCB) positioned in a transceiver module housing. The TOSA also connects with an optical fiber to permit the optical signals generated by the laser to be properly launched onto the optical network.

Similarly, the photodetector associated with the receiver is housed in a receiver optical sub-assembly, or ROSA. The ROSA communicates with a post-amplifier and other devices on the PCB in the module housing. The ROSA also connects with an optical fiber to permit incoming optical signals to be properly coupled into the ROSA. The housing of the transceiver module provides various functions, including mechanical stability and strength, maintenance of the proper positioning of the TOSA and ROSA, electromagnetic interference containment, electrical connection to the host device, and physical containment and protection for the TOSA, ROSA, PCB, and the devices on the PCB.

Although optical transceiver modules typically are constructed and operate according to industry standards, the mechanical details of the TOSA, ROSA, PCB, electrical connections therebetween, and the housing, often vary between devices produced by different manufacturers and between different models produced by individual manufacturers. One of the most important and difficult aspects associated with the design and construction of many optical transceiver modules concerns the stabilization of the TOSA and ROSA in a position where the TOSA and ROSA can properly connect with the optical fibers and engage in optical communication therewith.

BRIEF SUMMARY OF AN EXAMPLE EMBODIMENT

In general, embodiments of the invention are concerned with optical transceivers and, more specifically, to optical sub-assembly blocks that include a system for positioning and retaining components such as transmitter and receiver optical sub-assemblies in a desired position and orientation.

In one example embodiment, an optical transceiver is provided that includes a ROSA and a TOSA received within an OSA block. Additionally, two groups of adjustable elements are provided, one group for each of the ROSA and the TOSA. The adjustable elements of the first group engage the OSA block so as to contact the ROSA, and the adjustable elements of the second group engage the OSA block so as to contact the TOSA. The position of the adjustable elements in each respective group can then be varied as necessary to locate and/or maintain the ROSA and TOSA in desired positions and orientations relative to, for example, respective optical connector ports of the optical transceiver.

These and other aspects of exemplary embodiments of the present invention will become more fully apparent from the following description and appended claims.

BRIEF DESCRIPTION OF THE DRAWINGS

To further clarify the above and other aspects of example embodiments of the present invention, a more particular description of these examples will be rendered by reference to specific embodiments thereof which are illustrated in the appended drawings. It is appreciated that these drawings depict only example embodiments of the invention and are therefore not to be considered limiting of its scope. The invention will be described and explained with additional specificity and detail through the use of the accompanying drawings in which.

DETAILED DESCRIPTION OF SOME EXAMPLE EMBODIMENTS

As noted above, embodiments of the invention are concerned with optical sub-assembly blocks that include a system for positioning and retaining components such as transmitter and receiver optical sub-assemblies in a desired position and orientation. Among other things, this system enables the TOSA and ROSA of a transceiver to be secured and stabilized in a position where the TOSA and ROSA can interface with optical fibers and related components.

According to some embodiments of the invention, each optical sub-assembly is secured in an optical subassembly (OSA) block using a group of adjustable elements, such as set screws for example. Among other things, the adjustable elements constrain the position of the optical sub-assemblies so that the optical sub-assemblies cannot move in the longitudinal, or Z-axis, direction or in either of the two mutually orthogonal, or X-axis and Y-axis, directions that are perpendicular to the longitudinal direction.

Figure 1:
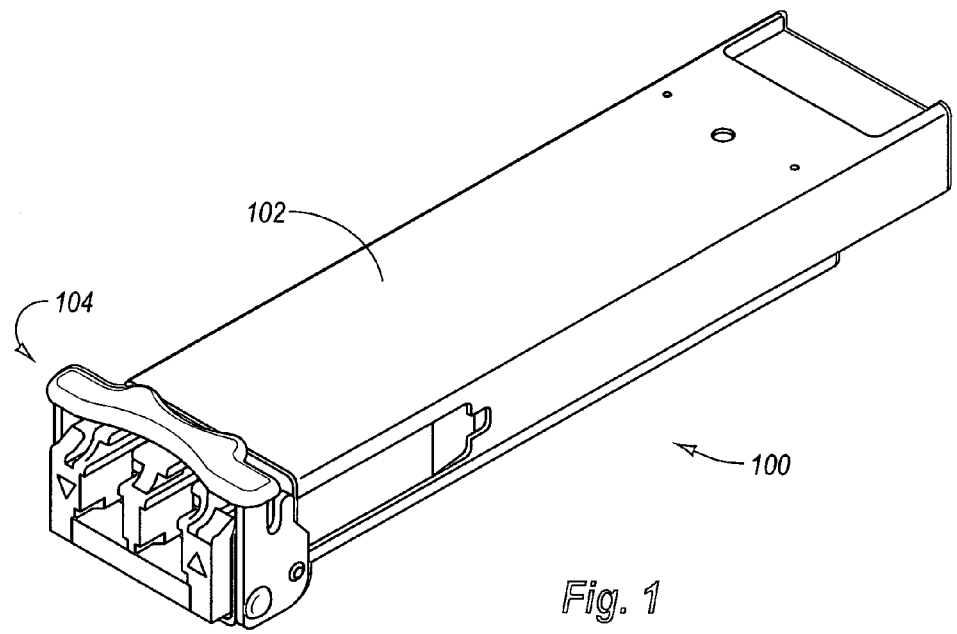
FIG. 1 is a partial perspective view of an example of an optical transceiver module.

With attention now to FIG. 1, details are provided concerning an example of a module 100 in connection with which embodiments of an OSA block may be employed. In some exemplary embodiments, the module 100 is implemented as a dense wavelength division multiplexing ("DWDM") optoelectronic transceiver module that complies with the XFP MSA. However, the scope of the invention is not so limited and, more generally, the principles underlying the structure and operation of the exemplary OSA block configurations disclosed herein can be applied to a wide variety of modules as well, examples of which include transceivers, transmitters, receivers, and transponders. Such other modules may be optoelectronic modules. Examples of other modules in connection with which the disclosure of this invention may be employed include, but are not limited to, optoelectronic transceiver modules that comply with particular MSAs, such as the SFP MSA, SFF MSA and X2 MSA.

In the illustrated embodiment, the module 100 includes a housing 102, a latch or other type of mechanism, designated at 104, attached to the housing 102. In general, such mechanisms are configured to enable insertion of the module 100 into, and removal of the module 100 from, devices such as host boards (not shown).

Figure 2:
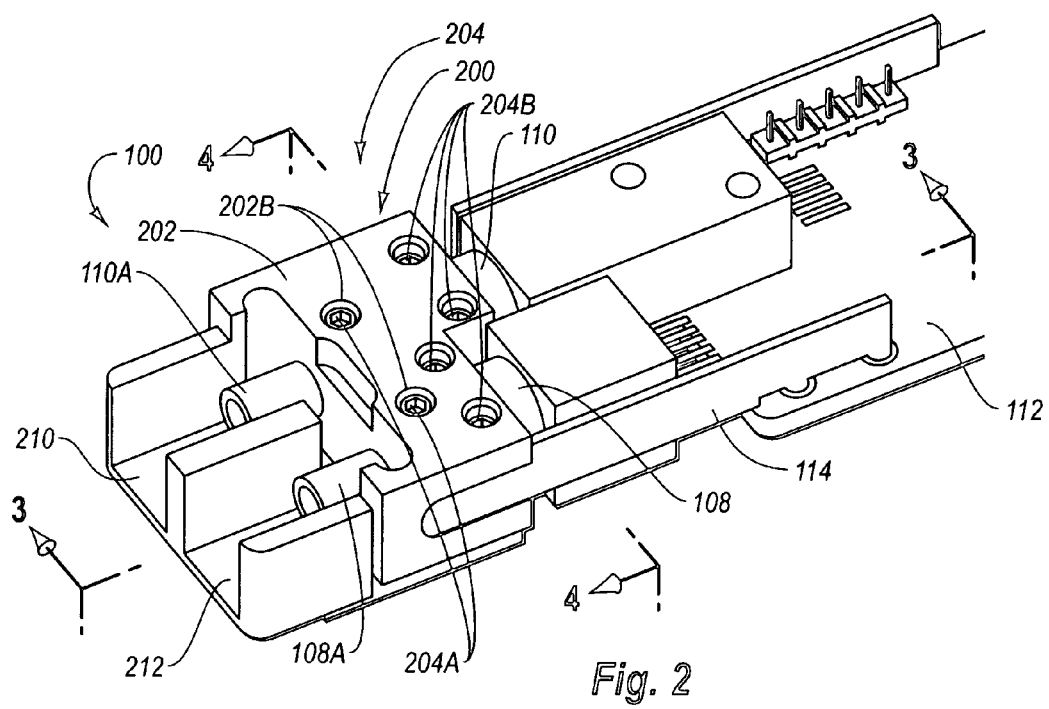
FIG. 2 is a perspective view of an OSA block, and discloses various details concerning the relation of the OSA block to other elements of an optical transceiver module.

Directing attention now to FIG. 2, details are provided concerning the internal structure and arrangement of the module 100 of FIG. 1. As indicated there, the example module 100 includes a transmitter optical subassembly ("TOSA") 110 and a receiver optical subassembly ("ROSA") 108. The TOSA 110 and ROSA 108 include respective nose portions 110A and 108A, as well as respective flanges 110B and 108B, and are configured and arranged for communication with a printed circuit board ("PCB") 112. In general, the PCB 112 includes circuitry for implementing the various functionalities associated with the particular implementation of the module 100. Such circuitry may include, for example, a post-amplifier, a laser driver, digital-to-analog converters, and a serial interface. In some instances, some or all of the laser driver circuitry, at least, is included in the TOSA.

In addition to being connected to the PCB 112, the TOSA 110 and ROSA 108 are also supported by an OSA block 200 that is attached to the PCB 112. The OSA block 200 can be attached to the PCB 112 in various ways. In the illustrated example, one or more arms 114 connect the OSA block 200 to the PCB 112. Other structures and arrangements may alternatively be employed however and the scope of the invention is not limited to the exemplary arrangements and structures disclosed herein.

With continued reference to FIG. 2, the example OSA block 200 comprises a block portion 202 and a plurality of adjustable elements, collectively denoted at 204, that are configured to engage the block portion 202. In this example, the adjustable elements 204 comprise, for each OSA, a group of forwardmost adjustable elements 204A and a group of rearmost adjustable elements 204B. Depending upon the application, the block portion 202 may comprise metal, plastic, or combinations thereof. In general, the configuration of the block portion 202 corresponds with the intended application of the module 100. In one specific embodiment, the configuration of the block portion 202 corresponds with the applicable requirements of the XFP MSA.

Figure 3:
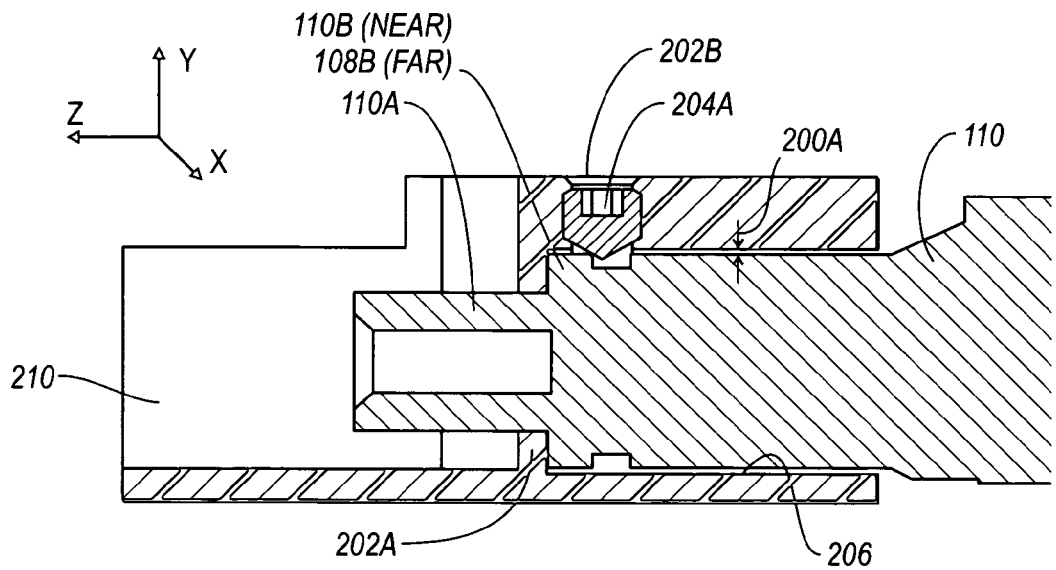
FIG. 3 is a partial section view, taken along line 3-3 of FIG. 2, of an OSA block indicating the position of an adjustable element configured and arranged to implement changes in, and/or maintain, a Z-axis position of an OSA.
Figure 4:
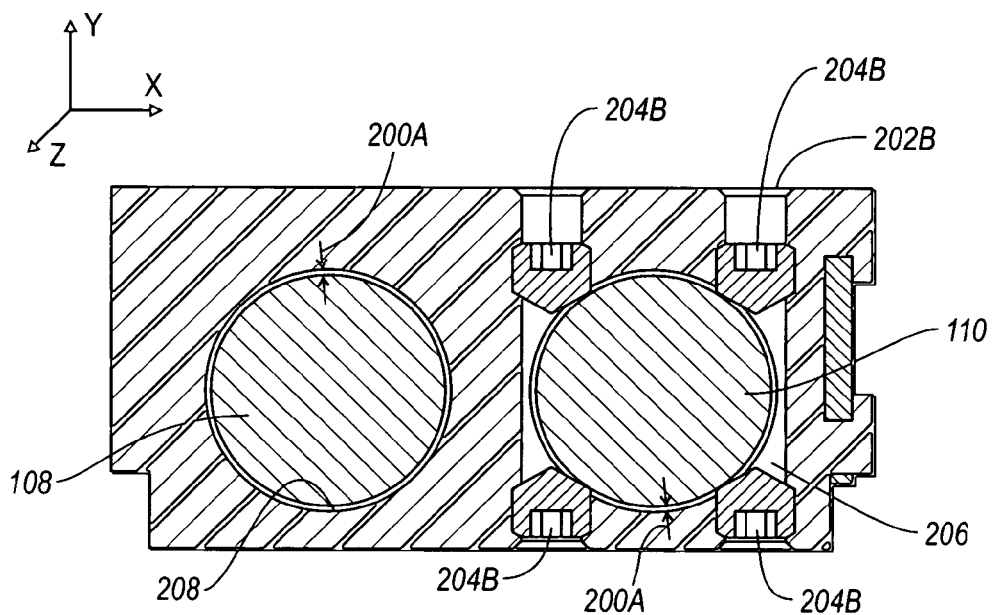
FIG. 4 is a partial section view, taken along line 4-4 of FIG. 2, of an OSA block indicating the position of a group of adjustable elements configured and arranged to implement changes in, and/or maintain, an X-axis and Y-axis position of an OSA.

As indicated in FIG. 2, and directing attention as well to FIGS. 3 and 4, the block portion 202 of the OSA block 200 defines one or more shoulders 202A and a plurality of openings 202B for receiving corresponding adjustable elements 204. The block portion 202 further defines a first cavity 206 within which a portion of the ROSA 108 is received. In similar fashion, the block portion 202 of the OSA block 200 defines a second cavity 208 within which a portion of the TOSA 110 is received.

The block portion 202 further defines a first port 210 in communication with the first cavity 206 such that a nose portion 108A of the ROSA 108 can be positioned in the first port 210. Similarly, the block portion 202 defines a second port 212 in communication with the second cavity 208 such that a nose portion 110A of the TOSA 110 can be positioned in the second port 212. In this way, the block portion 202 is configured so as to aid in positioning and retention of the TOSA 110 and ROSA 108 such that those components are able to interface with respective optical connectors received in the first and second ports 210 and 212 defined by the block portion 202. The first and second ports 210 and 212 can be configured as necessary to engage a particular type of connector. In some example embodiments, the first and second ports 210 and 212 are configured to receive LC optical connectors.

As disclosed herein, the first and second cavities 206 and 208, in cooperation with the first and second ports 210 and 212, implement the initial positioning of the TOSA 110 and ROSA 108. The adjustable elements 104 enable subsequent attainment of the desired final X, Y and Z positions of the TOSA 110 and ROSA 108, as well as retention of the TOSA 110 and ROSA 108 in a desired position.

In the example embodiment of FIGS. 2-4, the OSA block 200 includes two sets of five adjustable elements 104 each. In some embodiments, the adjustable elements comprise set screws. However, any other structure(s) or devices of comparable functionality may alternatively be employed. Thus, the adjustable elements disclosed herein are, individually and collectively, example structural implementations of a means for positioning and retention. It should be noted that, notwithstanding the use of the terminology "positioning and retention" in connection with such means, it is contemplated that the aforementioned means may perform only positioning, or only retention, or a combination of both positioning and retention. Moreover, such use of the terminology "positioning and retention" does not, and should not be construed to, foreclose the performance of additional functionality beyond the aforementioned positioning and/or retention functionalities.

With continuing reference now to the Figures, the example OSA block 200 defines a plurality of openings 202B, each of which communicates with either the first cavity 206 or the second cavity 208. Where the adjustable elements 204 are implemented as set screws or comparable devices, the openings 202B are threaded so as to engage the adjustable elements 204. As a consequence of the configuration and arrangement of the openings 202B and adjustable elements 204, the position of each of the adjustable elements 204 relative to the first or second cavities 206 and 208 within which the TOSA 110 and ROSA 108 are received, can be varied as desired. As evidenced by the gaps 200A between the OSA block 200 and the OSAs, the example OSA block 200 is constructed so as to allow some free play between each of the OSAs and the OSA block 200. This construction of the OSA block 200 allows the adjustable elements 204 to be operated as necessary to position and secure the OSAs.

In the illustrated embodiment, two groups of adjustable elements 204 are provided, one set each for the TOSA 110 and ROSA 108. Each of the exemplary groups includes five adjustable elements 204 positioned generally as indicated in FIGS. 2-4. However, the number, type and arrangement of adjustable elements in each group can be varied as desired. As best illustrated in FIGS. 2 and 3, one of the forwardmost, relative to the port end of the module 100, adjustable elements 204A is configured and arranged to extend at least partially into the first cavity 206 within which the ROSA 108 is received, while the other forwardmost adjustable element 204A is configured and arranged to extend at least partially into the second cavity 208 within which the TOSA 110 is received. In the illustrated example, each of the forwardmost adjustable elements 204A is located on the top of the module 100 but, more generally, one or both of the forwardmost adjustable elements 204A can be positioned in any other suitable location(s).

As a result of this example arrangement, such adjustable elements 204A are able to interact with corresponding structure of, respectively, the TOSA 110 and the ROSA 108. In the illustrated example, movement of a forwardmost adjustable element 204A downward into the corresponding cavity will result in a forward, or positive, Z-axis motion of the OSA with which that forwardmost adjustable element 204A is in contact. More specifically, this movement of the OSA is achieved in this example by way of a cam effect implemented by the changes to the position of the forwardmost adjustable element 204A relative to the corresponding OSA flange, particularly, either flange 108A or 110A. That is, as the forwardmost adjustable element 204A rotates downward toward the OSA, the forwardmost adjustable element 204A contacts the flange 108A or 110A, as applicable, and the Z-axis component of the force exerted by the adjustable element 204A is transmitted to the OSA, moving the OSA forward along the Z-axis. As the foregoing suggests, the forward motion of the OSA continues until the OSA contacts the shoulder 202A defined within the block portion 202. Once the OSA is positioned against the shoulder 202A, the forwardmost adjustable element 204A serves to retain the OSA in that Z-axis position and/or to prevent motion of the OSA beyond a defined Z-axis position. In some embodiments, at least some adjustment can be made to the Z-axis position of each OSA by changing the position of the corresponding forwardmost adjustable element 204A.

As noted above, each OSA is associated with a respective group of adjustable elements, at least one of which is employed to locate and maintain the OSA in a desired Z-axis position. With particular attention now to FIGS. 2 and 4, each such group of adjustable elements 204 further includes one or more rearmost adjustable elements 204B. In the illustrated example, there are four rearmost adjustable elements 204B in each group associated with an OSA, two of which are positioned above the corresponding OSA and two of which are positioned below the corresponding OSA, although it may be desirable to employ more, or fewer, rearmost adjustable elements in this arrangement, or in other arrangements. As further indicated in the illustrated example, the four rearmost adjustable elements 204B are arranged at about 90 degree intervals about an imaginary axis parallel to the Z-axis and passing through the cavity and port within which the OSA is positioned.

In general, the rearmost adjustable elements 204B are configured and arranged to enable achievement of desired X-axis and Y-axis positions of the OSA. The rearmost adjustable elements 204B also enable retention of the OSAs in the desired X-axis and Y-axis positions. More particularly, one or more of the rearmost adjustable elements 204B can be adjusted to the extent necessary to contact the corresponding OSA and move the OSA to the desired X-axis and/or Y-axis position. Further, the rearmost adjustable elements 204B additionally serve to retain the OSA in desired X-axis and/or Y-axis position and/or to prevent motion of the OSA beyond a defined X-axis and/or Y-axis limit. For example, and as disclosed in further detail elsewhere herein, the rearmost adjustable elements 204B may be employed to stabilize and secure the OSA in a desired X-axis and/or Y-axis position once the OSA has been placed in that desired position by another process, such as an assembly process for example. In one example of such an assembly process, the rearmost adjustable elements 204B do not perform any positioning function, but serve only to retain the OSA in a desired X-axis and Y-axis position.

As suggested above, one or more considerations such as the number, type, positioning, orientation, and/or arrangement of the adjustable elements 204 may be varied to suit considerations such as particular applications, the effects desired to be achieved, and particular OSA and module constraints. Accordingly, the scope of the invention is not limited to the example embodiments disclosed herein.

Directing attention now to FIGS. 1-4, details are provided concerning an example of a method by which some or all of the module 100 may be assembled. Initially, the TOSA 110 and ROSA 108 are positioned in the OSA block 200. In general, the OSA block 200 locates and rigidly mounts both the TOSA 110 and the ROSA 108 in correct relation to the first and second ports 210 and 212, respectively.

More particularly, the TOSA 110 and ROSA 108 are each positioned in a corresponding cavity defined by the OSA block 200 so that the respective nose portions 110A and 108A of the TOSA 110 and ROSA 108, respectively, are positioned generally as indicted in FIG. 3. During this stage of the assembly process, the nose portions 10A and 108A of the TOSA 110 and ROSA 108 are clamped in a fixture (not shown) to maintain a desired alignment while the adjustable elements 204 are installed in the block portion 202 and, in general, adjusted to the extent necessary to secure and stabilize the TOSA 110 and ROSA 108 in the desired locations.

With more particular reference to the use of the adjustable elements 204 with respect to the OSAs, FIGS. 3 and 4 illustrate the use of the adjustable elements 204 to stabilize the TOSA 110 with respect to OSA block 200. The use of corresponding adjustable elements 204 to stabilize the ROSA 108 with respect to the OSA block 200 is similar. First, during installation, a forwardmost adjustable element 204A engages the TOSA 110 behind flange 110B as shown in FIG. 3, and pushes the TOSA 110 forward to lock the TOSA 110 in a desired Z-axis position.

Next, the four rearmost adjustable elements 204B, as shown in the cross-sectional view of FIG. 4, are tightened to lightly contact the TOSA 110 and to stabilize and maintain the TOSA 110 in the correct X-axis and Y-axis position. Among other things, the stabilization of the TOSA 110 in the proper X-axis and Y-axis positions serves to maintain an appropriate nose angle as required by a specification, such as the LC specification for example, and permits the TOSA 110 to properly interface with the optical fiber carried in the optical connector (not shown). As noted above, a similar process is applied to stabilize the ROSA 108. After the adjustable elements 204 are in place, the assembled OSA block 200 is soldered to the PCB 112 and the resulting assembly is then installed in the housing 102.

The present invention may be embodied in other specific forms without departing from its spirit. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An OSA block, comprising:
   a block portion that defines a cavity configured to at least partially receive an optical subassembly, the block portion further defining a port in communication with the cavity; and
   a group of adjustable elements engaged with the block portion such that a position of each of the adjustable elements is variable with respect to the cavity, and each of the adjustable elements being configured and arranged to assume a position where the adjustable element extends at least partially into the cavity.

2. The OSA block as recited in claim 1, wherein the OSA block is configured to be employed in a module that is substantially compliant with one of the XFP MSA, the SFF MSA, the SFP MSA, and the X2 MSA.

3. The OSA block as recited in claim 1, wherein the block portion comprises metal.

4. The OSA block as recited in claim 1, wherein the OSA block comprises an element of an optoelectronic module.

5. The OSA block as recited in claim 1, wherein four of the adjustable elements are distributed at approximately 90 degree intervals about an imaginary axis extending longitudinally through the cavity and the port.

6. The OSA block as recited in claim 1, wherein:
   the block portion defines:
      an additional cavity configured to at least partially receive an additional optical subassembly;
      an additional port in communication with the additional cavity; and
   the OSA block further comprises an additional group of adjustable elements, each of which is engaged with the block portion and each of whose position is variable so that that each of the adjustable elements in the additional group of elements is able to extend at least partially into the additional cavity.

7. The OSA block as recited in claim 1, wherein the port is configured to removably receive an LC connector.

8. The OSA block as recited in claim 1, wherein the adjustable elements comprise set screws.

9. A module, comprising:
   a ROSA;
   a TOSA; and
   an OSA block, comprising:
      a block portion that defines:
         a first cavity within which the ROSA is at least partially received; and
         a second cavity within which the TOSA is at least partially received; and
      a set of adjustable elements engaged with the block portion, each of the adjustable elements being configured and arranged to assume a position where the adjustable element contacts one of the ROSA; and, the TOSA.

10. The module as recited in claim 9, wherein the optoelectronic transceiver is substantially compliant with one of the XFP MSA, the SFF MSA, the SFP MSA, and the X2 MSA.

11. The module as recited in claim 9, wherein the adjustable elements comprise set screws.

12. The module as recited in claim 9, wherein a selected change in position of one of the adjustable elements corresponds to a change in a Z-axis position of one of the ROSA; and, the TOSA.

13. The module as recited in claim 9, wherein:
   the block portion at least partially defines a first port in communication with the first cavity; and
   the block portion at least partially defines a second port in communication with the second cavity.

14. The module as recited in claim 13, wherein the first and second ports are each configured to removably receive an LC connector.

15. An optoelectronic transceiver, comprising:
   a TOSA;
   a ROSA; and
   an OSA block, comprising:
      a block portion within which the TOSA and ROSA are at least partially received;
      first means for positioning and retention, the first means being operably disposed with respect to the TOSA; and
      second means for positioning and retention, the second means being operably disposed with respect to the ROSA.

16. The optical transceiver as recited in claim 15, wherein:
   the first means for positioning and retention implements Z-axis positioning of the TOSA, and the first means for positioning and retention substantially retains the TOSA at a desired X-axis and Y-axis position; and
   the second means for positioning and retention implements Z-axis positioning of the ROSA, and the second means for positioning and retention substantially retains the ROSA at a desired X-axis and Y-axis position.

17. The optical transceiver as recited in claim 15, wherein the first and second means for positioning and retention implement Z-axis positioning of the ROSA and the TOSA, respectively, through employment of a cam effect.

18. The optical transceiver as recited in claim 15, wherein:
   the first means for positioning and retention comprises a first group of set screws engaged with the block portion and arranged for selective contact with the TOSA; and
   the second means for positioning and retention comprises a second group of set screws engaged with the block portion and arranged for selective contact with the ROSA.

19. The optical transceiver as recited in claim 15, wherein the block portion at least partially defines:
   a first LC optical connector port in communication with the TOSA; and
   a second LC optical connector port in communication with the ROSA.

20. The optical transceiver as recited in claim 15, wherein the optoelectronic transceiver is substantially compliant with one of the XFP MSA, the SFF MSA, the SFP MSA, and the X2 MSA.

* * * * *

UNITED STATES PATENT AND TRADEMARK OFFICE
CERTIFICATE OF CORRECTION

PATENT NO. : 7,309,170 B2
APPLICATION NO. : 11/412377
DATED : December 18, 2007
INVENTOR(S) : Ice et al.

It is certified that error appears in the above-identified patent and that said Letters Patent is hereby corrected as shown below:

Column 6
Line 44, change "10A" to --110A--

Signed and Sealed this

Second Day of November, 2010

David J. Kappos
*Director of the United States Patent and Trademark Office*